US011939982B2

(12) United States Patent
Ruppert et al.

(10) Patent No.: US 11,939,982 B2
(45) Date of Patent: Mar. 26, 2024

(54) SYSTEM FOR DISTRIBUTING PARTICULATE MATERIAL FROM AN AGRICULTURAL MACHINE

(71) Applicant: CNH Industrial America LLC, New Holland, PA (US)

(72) Inventors: Rex Ruppert, Benson, MN (US); David Hafvenstein, Benson, MN (US)

(73) Assignee: CNH Industrial America LLC, New Holland, PA (US)

( * ) Notice: Subject to any disclaimer, the term of this patent is extended or adjusted under 35 U.S.C. 154(b) by 1042 days.

(21) Appl. No.: 16/707,247

(22) Filed: Dec. 9, 2019

(65) Prior Publication Data
US 2021/0172444 A1 Jun. 10, 2021

(51) Int. Cl.
| | | |
|---|---|---|
| F04D 15/00 | (2006.01) | |
| A01C 15/04 | (2006.01) | |
| A01C 21/00 | (2006.01) | |
| A01C 23/00 | (2006.01) | |
| F04D 13/04 | (2006.01) | |

(52) U.S. Cl.
CPC .......... F04D 15/0066 (2013.01); A01C 15/04 (2013.01); A01C 21/005 (2013.01); A01C 23/007 (2013.01); F04D 13/046 (2013.01)

(58) Field of Classification Search
CPC ..... A01C 15/04; A01C 21/005; A01C 23/007; F04D 13/046
See application file for complete search history.

(56) References Cited

U.S. PATENT DOCUMENTS 6,070,539 A * 6/2000 Flamme ............... A01M 7/0089
701/50
7,380,733 B2 * 6/2008 Owenby ................ A01C 7/122
239/682

(Continued)

FOREIGN PATENT DOCUMENTS

| CN | 201741006 | 2/2011 |
| CN | 106444445 | 2/2017 |

(Continued)

OTHER PUBLICATIONS

Robert "Bobby" Grisso, Mark Alley, Wade Thomason, David Holshouser, Gary T. Roberson; "Precision Farming Tools: Variable-Rate Application"; article; Jan. 2011; 17 pages; Publication 442-505; Virginia Cooperative Extension.

*Primary Examiner* — Monica L Perry
*Assistant Examiner* — Aaron M Rodziwicz
(74) *Attorney, Agent, or Firm* — Rebecca L. Henkel; Rickard K. DeMille

(57) ABSTRACT

A system for distributing particulate material from an agricultural machine includes a fan configured to provide an airflow in a supply line for distributing particulate material, a hydraulic system configured to drive the fan at a plurality of fan speeds, and a control system configured to control the hydraulic system. The control system executes a program stored in a non-transient medium operable to: determine a given product application rate for distributing the particulate material; determine a given ground speed of the agricultural machine; determine a fan speed for achieving the given product application rate at the given ground speed; and control the hydraulic system to drive the fan at the fan speed.

11 Claims, 4 Drawing Sheets

(56) References Cited

U.S. PATENT DOCUMENTS

| | | | |
|---|---|---|---|
| 7,694,638 B1* | 4/2010 | Riewerts | A01C 23/007 |
| | | | 239/602 |
| 8,649,942 B2 | 2/2014 | Mitchell | |
| 8,868,300 B2* | 10/2014 | Kocer | A01C 21/005 |
| | | | 111/178 |
| 9,820,431 B2* | 11/2017 | Conrad | A01M 9/0092 |
| 9,999,175 B2* | 6/2018 | Baurer | A01C 7/102 |
| 11,013,164 B1* | 5/2021 | O'Rourke | A01C 7/105 |
| 2007/0266917 A1* | 11/2007 | Riewerts | A01C 7/105 |
| | | | 111/200 |
| 2012/0234934 A1 | 9/2012 | Score et al. | |
| 2013/0061789 A1* | 3/2013 | Binsirawanich | G01F 1/86 |
| | | | 111/107 |
| 2013/0152835 A1* | 6/2013 | Stevenson | A01C 5/064 |
| | | | 111/163 |
| 2013/0192503 A1* | 8/2013 | Henry | A01C 7/082 |
| | | | 111/14 |
| 2013/0333601 A1* | 12/2013 | Shivak | A01C 7/04 |
| | | | 111/177 |
| 2014/0252111 A1* | 9/2014 | Michael | A01M 7/0042 |
| | | | 239/11 |
| 2014/0263708 A1* | 9/2014 | Thompson | A01C 23/007 |
| | | | 239/11 |
| 2014/0277780 A1* | 9/2014 | Jensen | A01M 7/0089 |
| | | | 700/283 |
| 2014/0277954 A1* | 9/2014 | Nelson, Jr. | G06F 11/30 |
| | | | 701/50 |
| 2015/0094916 A1* | 4/2015 | Bauerer | G01V 8/20 |
| | | | 701/50 |
| 2018/0051694 A1 | 2/2018 | Mirzakhani-Nafchi et al. | |

FOREIGN PATENT DOCUMENTS

| | | | | |
|---|---|---|---|---|
| CN | 109906739 | | 6/2019 | |
| DE | 3642502 | | 6/1988 | |
| EP | 3100604 | | 12/2016 | |
| JP | 2010022333 | | 2/2010 | |
| KR | 100644431 | | 11/2006 | |
| WO | WO-2014018717 A1 * | | 1/2014 | A01B 49/06 |

* cited by examiner

SYSTEM FOR DISTRIBUTING PARTICULATE MATERIAL FROM AN AGRICULTURAL MACHINE

FIELD OF THE INVENTION

The present invention pertains to agricultural equipment and, more specifically, to a system for distributing or spreading particulate material from an agricultural machine by determining a product application rate for distributing the particulate material and a ground speed of the agricultural machine, and by determining a fan speed for achieving the product application rate at the ground speed.

BACKGROUND OF THE INVENTION

Agricultural product delivery systems are known to utilize various mechanisms, including mechanical and pneumatic systems to move granular or particulate material or product, such as fertilizer, seed, insecticide or herbicide, from a product supply chamber, through a series of elongated tubes that extend from a product supply chamber to a product applicator, and placing the product on, or in a growing medium, such as soil. Such agricultural product delivery systems are commonly employed in planters, air drills, fertilizer and pesticide applicators and a variety of other agricultural implements.

In such agricultural product delivery systems, engine speed and ground speed are typically proportional to one another, and in hydrostatic drive product application systems, the fan speed for metering material onto an agricultural field is typically proportional to the engine speed. However, at certain times, such as during deceleration upon approaching turns, proportionality between engine speed and ground speed can be lost with engine speed dropping much more rapidly than ground speed. This loss in engine speed can cause a loss in fan speed necessary for metering material at the correct rate for the given ground speed. As a result, metered material can appear to "pulse" onto the ground with uneven spreading. A need therefore exists to provide a system for distributing particulate material from an agricultural machine which eliminates one or more of the foregoing disadvantages.

SUMMARY OF THE INVENTION

The present invention provides a control system configured to reference a data structure, such as a look up table, to variably control fan speed based on ground speed of an agricultural machine, independent of engine speed of the machine, to achieve a given application rate for a field. In one aspect, the control system can control a Pulse Width Modulation (PWM) solenoid to a pump causing a transfer of a given amount of fluid to achieve a correct fan speed according to the data structure. As a result, fan speeds can be prescribed for any application rate, such as a light application rate of 100 pounds per acre, with slowing the fan down, or a heavy application rate of 1000 pounds per acre, with speeding the fan up, all as a function of ground speed, while decoupled from engine speed. This can allow conserving horsepower by keeping the fan speed to only levels which are necessary for the application rate.

In one aspect, a control system can reference a look up table for precisely controlling fan speed in a hydraulic system based on ground speed to ensure a given application rate is continuously satisfied. For example, the machine may be running in the field at 18 mph (miles per hour) with an engine speed of 2100 RPM (revolutions per minute) and a corresponding fan speed of 6000 RPM (pump being 75% stroked) delivering a desired 600 pounds per acre. When decelerating to 14 mph, such as when approaching an 8 mph turn, the engine speed might drop to 1300 RPM, which might ordinarily result in the fan speed dropping to about 3714 RPM (pump being 75% stroked). However, this fan speed may be too low for the application rate (lower than 600 pounds per acre) at the 14 mph ground speed. Instead of allowing such a drop in fan speed, according to the invention, the control system can reference the look up table, such as at the 600 pounds per acre application rate and the 14 mph speed, and using a hydrostatic drive system, precisely control the fan speed to an improved 4667 RPM to continue to meet the given application rate (600 pounds per acre) for the ground speed (by changing the pump to be 100% stroked). In one aspect, the system can allow electronic control of a swash plate of a hydrostatic pump which can be changeable on demand. Different stroke/set-points can be used for different machine speeds according to the look up table.

In one aspect, the invention can provide variable fan speed control. One or more hydraulic configurations can be used to produce such variable fan speed control, including: a variable displacement pump in a hydrostatic (closed-loop) system with one or more variable or fixed-displacement motors; a variable displacement pump in an open-loop system with one or more variable or fixed-displacement motors; a fixed displacement pump with one or more variable-displacement motors; and a fixed displacement pump with a fixed-displacement motor and a hydraulic valve configured to control the flow rate of oil sent to the motor.

Specifically then, one aspect of the present invention can provide a system for distributing or spreading particulate material from an agricultural machine, the system including: a fan configured to provide an airflow in a supply line for distributing particulate material; a hydraulic system configured to drive the fan at multiple fan speeds; and a control system configured to control the hydraulic system, the control system executing a program stored in a non-transient medium operable to; determine a given product application rate for distributing the particulate material; determine a given ground speed of the agricultural machine; determine a fan speed for achieving the given product application rate at the given ground speed; and control the hydraulic system to drive the fan at the fan speed.

Another aspect of the present invention can provide a method for distributing or spreading particulate material from an agricultural machine, the method including: configuring a fan to provide an airflow in a supply line for distributing particulate material; configuring a hydraulic system to drive the fan at multiple fan speeds; determining a given product application rate for distributing the particulate material; determining a given ground speed of the agricultural machine; determining a fan speed for achieving the given product application rate at the given ground speed; and controlling the hydraulic system to drive the fan at the fan speed.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

While the invention is described herein in connection with certain preferred embodiments, there is no intent to limit it to those embodiments. On the contrary, the intent is to cover all alternatives, modifications and equivalents within the spirit and scope of the invention as defined by the appended claims.

DETAILED DESCRIPTION OF THE INVENTION

Figure 1:
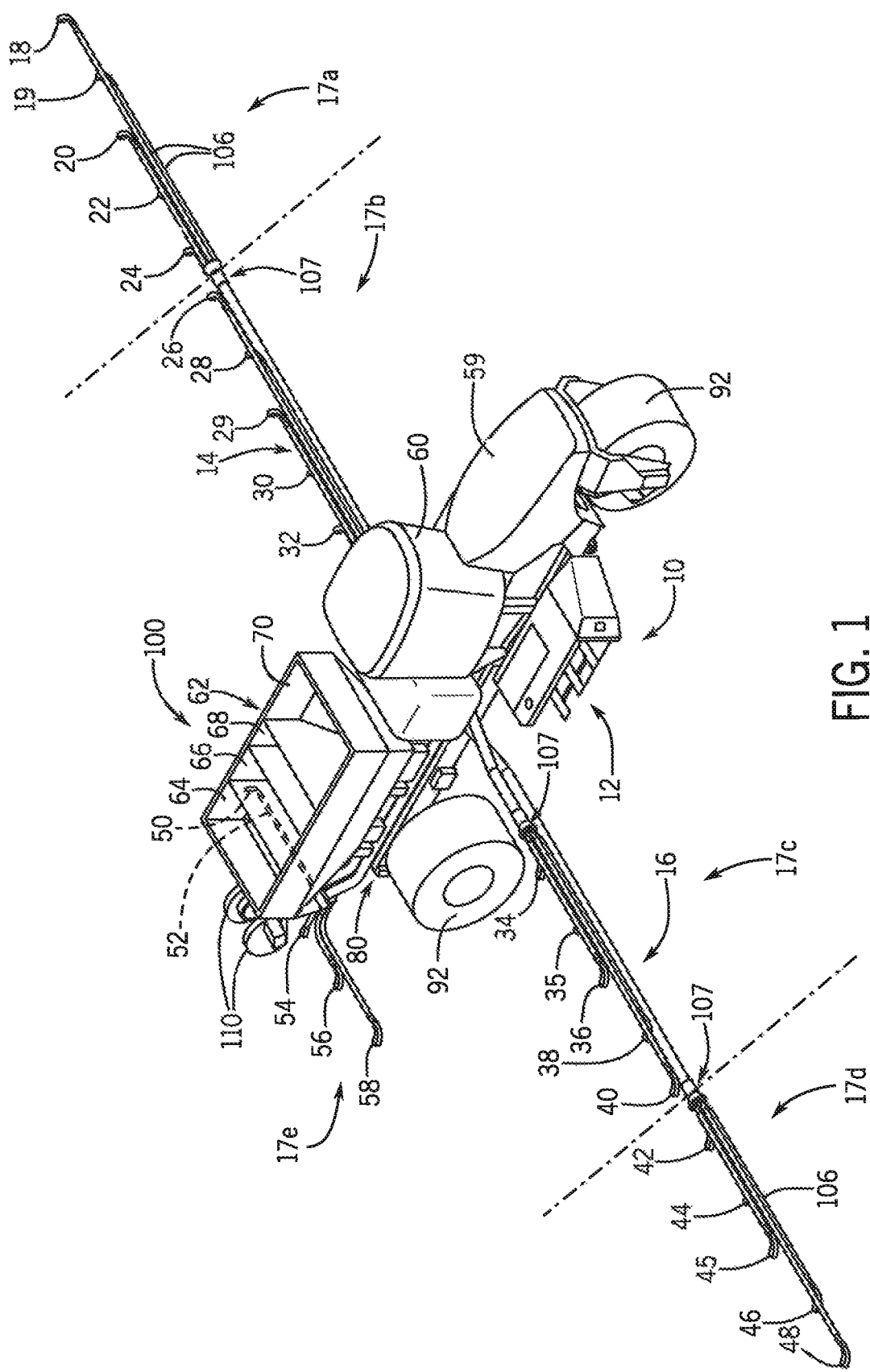
FIG. 1 illustrates an isometric view of an exemplary embodiment of an agricultural application implement, in the form of a dry granular applicator, comprising a system for distributing particulate material in accordance with an aspect of the present invention.
Figure 2:
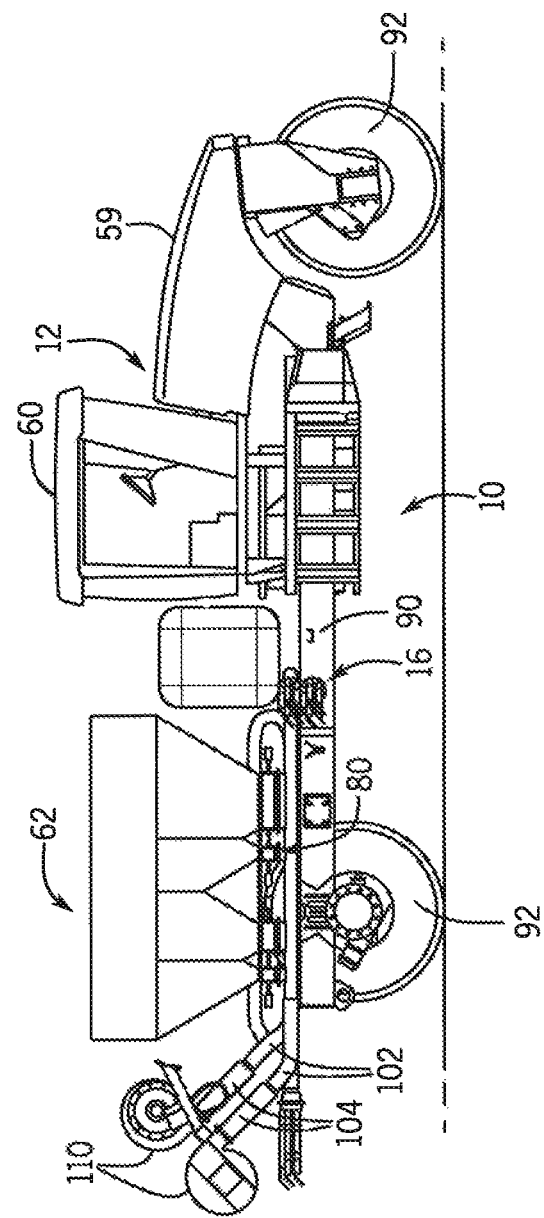
FIG. 2 illustrates a side elevation view of the applicator of FIG. 1.

Referring now to the drawings, and more particularly to FIGS. 1 and 2, there is shown an agricultural application implement 10, which could be a dry pneumatic granular applicator, which can include a system for unloading particulate material in accordance with an aspect of the present invention. As is known in the art, implement 10 generally includes a large wheeled transport unit 12 such as truck or tractor, and laterally extending particle delivery booms 14 and 16, which may be pivoted to a stowed position close to the implement for storage or transport. Each boom 14, 16 extends laterally from the implement 10 in opposite directions. Each boom 14, 16 includes a plurality of boom sections 17, such as left outer and left inner boom sections 17a, 17b of boom 14, and right inner and right outer boom sections 17c, 17d of boom 16. Each boom section 17 is defined by a large diameter supply line 102 for supplying the boom section with airflow from one or more fans 110 and entrained granular or particulate material, such as seed, fertilizer, herbicide, insecticide and the like. Each boom section 17 includes a plurality of boom tubes or conduits terminating at particle delivering units, which for the implement 10 are spreading outlets or nozzles. In the exemplary embodiment shown, left outer boom section 17a of boom 14 includes five nozzles 18, 19, 20, 22 and 24; left inner boom section 17b of boom 14 includes five nozzles 26, 28, 29, 30 and 32; right inner boom section 17c of boom 16 includes five nozzles 34, 35, 36, 38 and 40; and right outer boom section 17d of boom 16 includes five nozzles 42, 44, 45, 46 and 48. Additionally, at the back of implement 10 there is a centrally mounted rear boom section 17e also defined by a large diameter supply line 102 for supplying the boom section with granular material. At the rear boom section 17e are five rear nozzles 50, 52, 54, 56 and 58 to provide full and complete coverage across the width of implement 10, including the area between the inboard-most nozzles 32 and 34 of booms 14, 16. The rear boom section 17e allows spread of the particulate material/product over/onto the ground over which the implement 10 passes for complete coverage. Although five boom sections 17, with five nozzles per boom section, is shown by way of example, in other aspects greater or fewer boom sections 17, and/or greater or fewer nozzles per boom section 17, can be provided within the scope of the invention.

The transport unit 12 can be self-propelled by an engine in an engine compartment 59 and can include an operator cab 60 having a Human Machine Interface (HMI) available to the user. The transport unit 12 can comprise a frame 90 supported by wheels 92. In the exemplary embodiment shown, an uncovered tank 62, open to the environment and ambient atmospheric conditions, includes compartments 66 and 70 for carrying particulate material to be distributed by a metering array 80 for ultimate disbursement by nozzles 18-58. Further smaller compartments 64 and 68 are provided to supply micro-nutrients or other materials to the metering array 80. The supply of particulate in compartments 64, 66, 68, 70 can be replenished periodically from a supply vehicle (not shown). The tank 62 could have, for example, a capacity of about 350 cubic feet and/or 11 tons.

Figure 3:
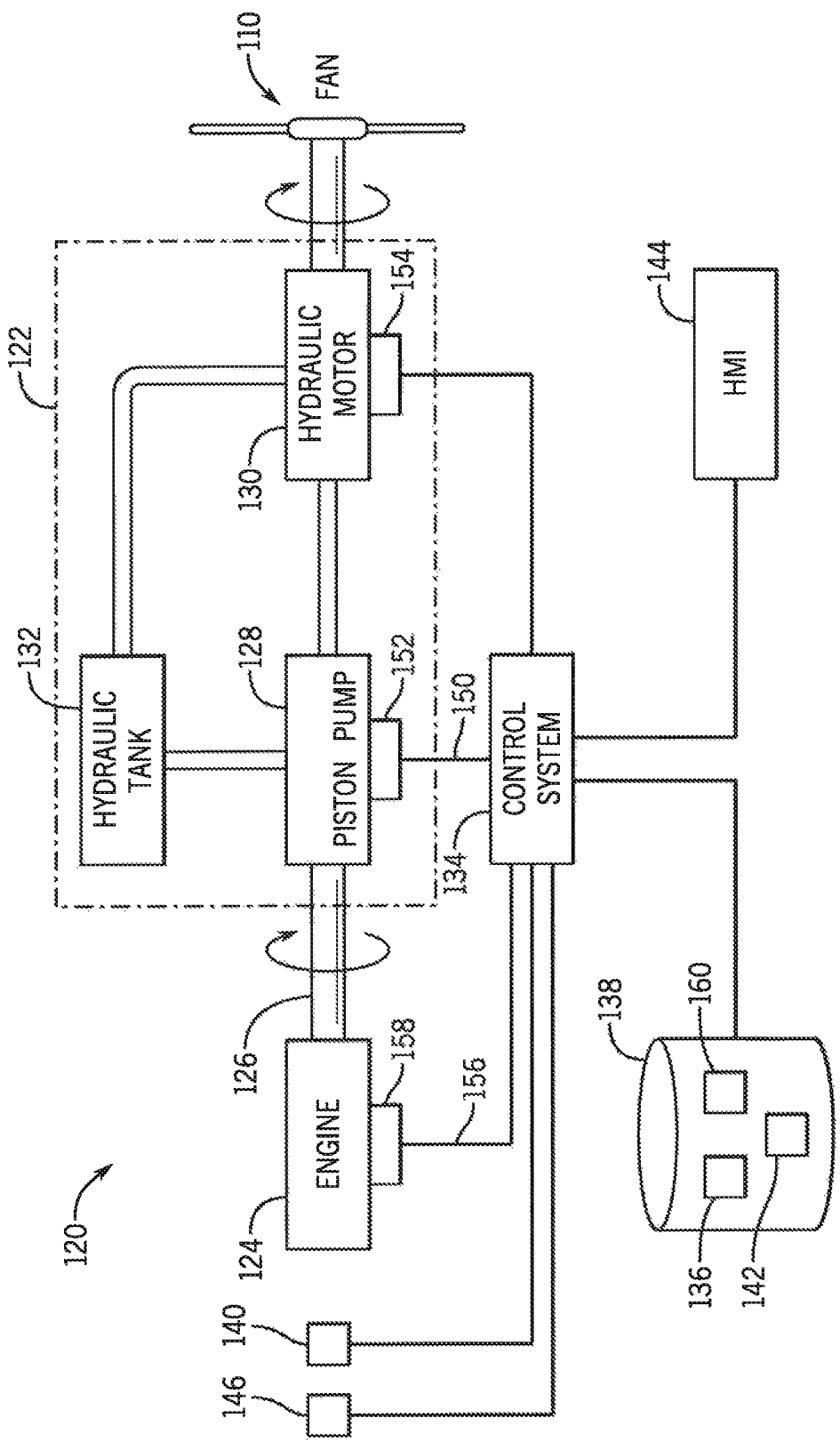
FIG. 3 illustrates a schematic view of a system for distributing particulate material in accordance with an aspect of the present invention.

With additional reference to FIG. 3, a schematic view of a system 120 for distributing particulate material, which system can be implemented on the implement 10, is provided in accordance with an aspect of the present invention. The system 120 can include a hydraulic system 122 configured to drive the one or more fans 110 at multiple fan speeds. The system 120 can receive mechanical power from an engine 124 in the engine compartment 59, such as by way of rotation of a crankshaft 126 connected to the hydraulic system 122, to derive hydraulic power for driving the one or more fans 110. In one aspect, the hydraulic system 122 can comprises a hydrostatic drive arrangement including a variable axial piston pump 128, or variable displacement pump, configured to drive a hydraulic motor 130, which in turn drives the one or more fans 110, and a hydraulic tank 132 in a fan control circuit.

A control system 134 can be configured to precisely control the hydraulic system 122 and the hydraulic power delivered therefrom. In one aspect, the control system 134 can execute a program 136 stored in a non-transient medium 138 operable to: determine a given product application rate for distributing particulate material, via the metering array 80, the supply lines 102 and the sections 17; determine a given ground speed of the implement 10; determine a fan speed for achieving the given product application rate at the given ground speed; and control the hydraulic system 122 to drive the one or more fans 110 at the determined fan speed. The control system 134 can determine the given product application rate for distributing particulate material from a current location on prescription map. The location could be detected, for example, by a location sensor 140, such as Global Positioning System (GPS), and compared to prescription map 142 stored in the non-transient medium 138. The control system 134 can also determine the given product application rate for distributing particulate material from input from an HMI 144 available to the user in the operator cab 60. The control system 134 can determine the given ground speed of the implement 10, or current speed, from a vehicle speed sensor 146. The control system 134 can then execute to determine a fan speed for the one or more fans 110 for achieving the given product application rate at the given ground speed. The control system 134 can then control the hydraulic system 122 to drive the one or more fans 110 at the determined fan speed, such as by controlling a Pulse Width Modulation (PWM) signal 150 provided to a solenoid 152 to selectively adjust the angle of swashplate contained in the variable axial piston pump 128. Moreover, the control system 134 can execute a closed loop control system by sensing feedback from the hydraulic motor 130 corresponding to actual fan speed via RPM sensor 154, calculating an error between the actual fan speed and the determined fan speed operating as a setpoint, and driving the pump 128 to more quickly and efficiently achieve the determined fan speed.

Accordingly, despite the engine 124 being configured to drive the hydraulic system 122 at multiple engine speeds, the hydraulic system 122 is operable to drive the one or more fans 110 at multiple fan speeds independently from the engine 124. Nevertheless, the control system 134 could communicate with the engine 124, such as via a Controller Area Network (CAN) bus 156 and CAN controller 158 of the engine, to detect such engine speeds.

Figure 4:
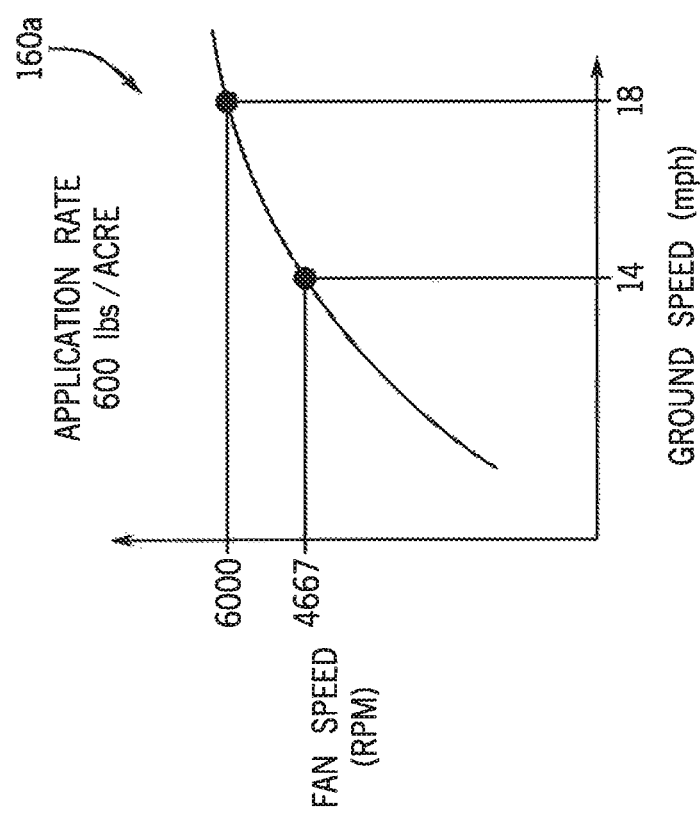
FIG. 4 illustrates a data structure in the form of a graph for determining fan speed in accordance with an aspect of the present invention.

In one aspect, the control system 134 can determine the fan speed for achieving the given product application rate at the given ground speed by calculating and/or referencing a data structure 160, such as a look up table, stored in a non-transient medium 138. The data structure 160 can correlate multiple fan speeds, for the one or more fans 110, to multiple ground speeds, for the implement 10, at given product application rates. For example, with additional reference to FIG. 4, the control system 134 can reference a first data structure 160a corresponding to a product application rate, such as a spread or distribution of 600 pounds per acre from a compartment of tank 62, desired according to a current location on the prescription map 142 and/or an input from the HMI 144. The control system 134 can then detect the ground speed of the implement 10, such as 18 mph, from the vehicle speed sensor 146. The control system. 1.34 can then control the hydraulic system 122 to drive the one or more fans 110 at a corresponding fan speed for the ground speed, such as 6000 RPM for 18 mph, via the PWM signal 150 adjusting tilt of the swashplate. The fan speeds of the data structure 160 can be correlated to ground speeds of the implement 10 according to a predetermined configuration of the implement 10, including a length and/or a diameter of supply lines 102, arrangement of sections 17 and/or nozzles 18-58, and the like.

If the desired application rate changes, such as due to a change in location and/or input to the HMI 144, control system 134 can reference a second data structure and/or calculation appropriate for the revised application rate. If the desired application rate stays the same, but the speed of the implement 10 changes to a new ground speed, such as decelerating to 14 mph when approaching an 8 mph turn, the control system 134 can control the hydraulic system 122 to drive the one or more fans 110 at a new fan speed corresponding to the new ground speed, such as 4667 RPM, via the PWM signal 150 further adjusting tilt of the swashplate. As a result, fan speeds can be prescribed for any application rate, all as a function of ground speed, while decoupled from engine speed. This can allow conserving horsepower by keeping the fan speed to only levels which are necessary for the application rate.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A system for distributing particulate material from an agricultural machine, the system comprising:
- a fan configured to provide an airflow in a supply line for distributing particulate material;
- a hydraulic system configured to drive the fan at a plurality of fan speeds, the hydraulic system comprising:
  - a hydrostatic drive arrangement including a variable axial piston pump; and
- a control system configured to control the hydraulic system, the control system executing a program stored in a non-transient medium operable to:
  - determine a given product application rate for distributing the particulate material;
  - determine a given ground speed of the agricultural machine;
  - determine a fan speed for achieving the given product application rate at the given ground speed; and
  - control the hydraulic system to drive the fan at the fan speed.

2. The system of claim 1, further comprising a solenoid configured to control displacement of the variable axial piston pump, wherein the control system controls the hydraulic system via a Pulse Width Modulation (PWM) signal to the solenoid.

3. The system of claim 1, further comprising an engine configured to drive the hydraulic system at a plurality of engine speeds, wherein the hydraulic system is operable to drive the fan at the plurality of fan speeds independently from the engine driving the hydraulic system at the plurality of engine speeds.

4. The system of claim 1, wherein the product application rate is determined from a prescription map.

5. The system of claim 1, further comprising a Human Machine Interface (HMI) in communication with the control system, wherein the product application rate is determined from input from the HMI.

6. The system of claim 1, wherein the ground speed is determined from a vehicle speed sensor or Global Positioning System (GPS).

7. The system of claim 1, wherein the control system determines the fan speed by referencing a data structure correlating a plurality of fan speeds to a plurality of ground speeds at a given product application rate.

8. The system of claim 7, wherein the plurality of fan speeds is correlated to the plurality of ground speeds according to a predetermined configuration of the agricultural machine including a length and a diameter of the supply line.

9. The system of claim 7, wherein the data structure comprises a look up table.

10. The system of claim 1, wherein the hydraulic system further comprises:
- a hydraulic motor configured to be driven by the variable axial piston pump of the hydrostatic drive arrangement.

11. A system for distributing particulate material from an agricultural machine, the system comprising:
- a fan configured to provide an airflow in a supply line for distributing particulate material;
- a hydraulic system configured to drive the fan at a plurality of fan speeds, the hydraulic system comprising:
  - a hydraulic motor;
  - a hydrostatic drive arrangement including a variable axial piston pump configured to drive the hydraulic motor;

a solenoid configured to control displacement of the variable axial piston pump; and a control system configured to control the hydraulic system, the control system executing a program stored in a non-transient medium operable to:

determine a given product application rate for distributing the particulate material;

determine a given ground speed of the agricultural machine;

determine a fan speed for achieving the given product application rate at the given ground speed; and control the hydraulic system via a Pulse Width Modulation (PWM) signal to the solenoid to drive the fan at the fan speed.

* * * * *